3,002,882
SYSTEMICALLY WORKING AGENT FOR COMBATING MICRO-ORGANISMS

Olga Marie van Andel, Wageningen, Netherlands, assignor to Nederlandse Centrale Organisatie voor Toegepast-Natuurwetenschappelijk Onderzoek, The Hague, Netherlands, a corporation of the Netherlands
No Drawing. Filed July 23, 1959, Ser. No. 828,947
Claims priority, application Netherlands July 28, 1958
17 Claims. (Cl. 167—22)

The invention relates to a systemically working protective agent against noxious micro-organisms present in or on a living plant, especially fungi.

Protective agents having a systemic effect are known per se. These agents exert their action on the treated surface of the plant or parts of plants as well as in the interior of the plant.

Examples of protective agents with systemic effect are the antibiotics streptomicin and griseofulvin and the antibiotic rimocidin which is particularly effective against internal seed parasites.

The object of the invention is to provide for a novel systemically active compostion of matter for protecting plants against internal infection, particularly against internal infection with fungi.

Another object of the invention is to provide for novel protective agents to be applied to plants or their roots.

A further object of the invention is to provide for a process for protecting plants against internal infection in a systemical way.

Other objects of the invention will appear from the description below.

According to the invention a mixture is prepared of an amino acid having the formula R—CHNH$_2$—COOH, in which R represents H or CH$_3$, CH$_2$OH, CHOHCH$_3$, or CHOHC$_6$H$_5$, and a substance which is active against micro-organisms, more particularly a protective agent having per se no or only a slight systemic effect, and said mixture is used after dilution by an appropriate carrier which is to be considered as inert for the purpose in question, for instance water, as most of the compounds in question are readily soluble in water. If, however, one of the compounds is not soluble enough in water, it can be used in the form of an aqueous slurry to which some surface active agent has been added, as is known per se in this field of art.

It has been found that, if parts of the living plant, such as roots, stems, leaves, etc. are brought into external contact with a preparation containing a slight quantity of the said mixture, an infection of the plant was entirely or partly suppressed in dependency on the quantities applied. The protective agent which is to be added to the amino acid, when applied by itself under otherwise similar circumstances is of the type which shows little or no systemic effect against internal infection. It is observed that in general only the D-form of the amino acid or the racemic DL-form are effective. In a single case the L-form too is effective.

Particularly suitable amino acids are WL-serine D(+) serine, DL-alanine, glycine and their N-monoalkyl derivatives, such as sarcosine; further DL threonine and L(—) threo-beta-phenylserine are also suitable. Most of the other amino acids had no effect or only a slight effect.

Useful fungicides for the combination have proved to be sodium dimethyl-dithiocarbamate (NaDDC), tetramethyl-thiuram monosulphide (TMTM), tetramethyl-thiuramdisulphide (TMTD) and the fungicides commercially available under the trade names "Phygon" and "Captan" (comprising as active substances 2.3-dichloronaphthoquinone and N-(trichloromethyl-thio)tetrahydrophthalimide respectively).

It has further been found that the amino acids mentioned above strengthened the, in itself, slight systemic protective effect of substances not active in vitro such as S-(carboxymethyl)-N-dimethyl-dithiocarbamate (G.33), to an important degree.

By tests carried out in vitro as to the fungicidal activity of the fungicidal substances which may according to the invention be combined with amino acids, it appeared that adding amino acids to these substances did not bring about the slightest effect; that is to say the action of these substances was not influenced in vitro, whilst the amino acids under consideration themselves in vitro do not show any fungicidal effect either.

It is, therefore, most surprising, that the combination according to the invention does lead to an effect in vivo namely the conferring of an important systemic protective activity on substances, which in themselves do not or do only to a slight degree show such activity.

The concentrations of the amino acids to be applied in general lie between about 0.1 and 1.0% by weight in a few cases, however, a concentration of 0.05 or 0.01% will already suffice. At higher concentrations undesirable reactions, such as growth-inhibiting and/or damage to the plant may occur. The appropriate concentration for the fungicide can be determined from case to case, it often (mostly) lies between 10 and 500 p.p.m. (parts per million). The weight ratio of amino acid to the organic fungicide should be 1:5 or higher, preferably between the ratios of 1:5 and 100:1.

A diluted solution of the mixtures according to the invention can be brought into contact with the plants to be protected in various ways e.g. by spraying it on to the leaves, by treating the roots of seedlings with the solution either by dipping the seedlings with their roots into it or by pouring the solution on the soil in which the plants are growing etc.

It has further been found that even some of the amino acids under consideration per se exert a systemic protection effect when administered to the plants or to the roots of the plants. More in particular, this is the case with D(+) serine and to a lesser extent with DL-serine though other amino acids such as DL-threonine, also show a noticeable systemic activity against internal infection of young plants with fungi.

The mode of application of the compounds in question and the result obtained is illustrated by the following comparative experiments.

A. CUCUMBER SEEDLINGS

Seedlings raised in sand, 7–10 days old, had their roots washed clean and placed in solutions of the compounds to be examined. After 2 days, the roots were rinsed and transplanted into tap water. The plantlets were inoculated by spraying with a conidial suspension of the fungus *Cladosporium cucumerinum*, and kept in a humid space at 20°. After 5–7 days the degree of infection of the hypocotyls was estimated, whereby no infection was valued at 0, very heavy infection at 6. Thus, for 10 plants the maximal disease index amounts to 60. In most cases the cotyledons had not been attacked. The disease index has been calculated by adding up the estimated numbers for the plantlets in each treatment. In some tests the compounds to be examined were given to the cotyledons. In that case 3% of agar were added to the same quantity which was otherwise used for the roots. The agar was cut into cubes which were fastened on both sides of each one of the cotyledons. After 2 days the cubes were removed, and the plants were inoculated and estimated, in the above-described way. In order to permit a better mutual comparison of the tests the relative disease index is fixed at 100 for the blank test in which only water was administered and the further values determined were multiplied by the factor 100 divided by the value determined for the blank.

*Example 1*

Compounds administered to the roots; 10 plants to each treatment.

|  | disease index | | disease index, rel. |
|---|---|---|---|
|  | determined | relative |  |
| $H_2O$ | 57→ | 100 with DL serine, 0.25%. | 49 |
| Na-dimethyldithiocarbamate (NaDDC), 100 p.p.m. |  | 68 with DL serine, 0.25%. | 3 |
| tetramethyl thiuram monosulphide (TMTM), 100 p.p.m. |  | 100 with DL serine, 0.25%. | 13 |
| tetramethyl thiuram disulphide (TMTD), 100 p.p.m. |  | 86 with DL serine, 0.25%. | 5 |

*Example 2*

Compounds administered to the roots; 10 plants per treatment.

|  | disease index | | disease index, rel. |
|---|---|---|---|
|  | det. | rel. |  |
| $H_2O$ | 60→ | 100 with 0.25% DL serine | 58 |
| "phygon": |  |  |  |
| 50 p.p.m. |  | 72 with 0.25% DL serine | 30 |
| 20 p.p.m. |  | do | 3 |
| "captan": |  |  |  |
| 50 p.p.m. |  | 100 with 0.25% DL serine | 37 |
| 25 p.p.m. |  | do | 22 |
| 10 p.p.m. |  | 90 with 0.25% DL serine | 25 |

*Example 3*

Compounds administered to the roots; 10 plants per treatment.

|  | disease index | | disease index, rel. |
|---|---|---|---|
|  | det. | rel. |  |
| $H_2O$ | 60→ | 100 with NaDDC 100 p.p.m. | 100 |
| DL-alanine, 0.25% |  | do | 27 |
| DL-threonine, 0.25% |  | 62 with NaDDC, 100 p.p.m. | 3 |
| DL-serine, 0.25% |  | 27 with NaDDC, 100 p.p.m. | 4 |
| sacrosine, 0.10% |  | 100 with NaDDC, 100 p.p.m. | 12 |
| sacrosine, 0.05% |  | do | 15 |

*Example 4*

Compounds administered to the roots; 10 plants per treatment.

|  | disease index | | disease index, rel. |
|---|---|---|---|
|  | det. | rel. |  |
| $H_2O$ | 55→ | 100 with NaDDC, 100 p.p.m. | 58 |
| DL-alanine, 0.035 mol |  | 73 with NaDDC, 100 p.p.m. | 15 |
| glycine, 0.035 mol |  | 98 with NaDDC, 100 p.p.m. | 24 |

*Example 5*

Compounds administered to the roots; 10 plants per treatment.

|  | disease index | |
|---|---|---|
|  | det. | rel. |
| $H_2O$ | 51→ | 100 |
| 0.25% DL-threonine |  | 2 |
| 0.50% DL-threonine |  | 0 |
| 0.25% allothreonine |  | 56 |
| 0.25% L(−) threo beta phenyl serine |  | 14 |

*Example 6*

Compounds administered to the cotyledons; 10 plants per treatment.

|  | disease index | |
|---|---|---|
|  | det. | rel. |
| $H_2O$ | 54→ | 100 |
| glycine, 0.25% |  | 69 |
| NaDDC, 100 p.p.m. |  | 61 |
| glycine 0.25%+NaDDC, 100 p.p.m. |  | 17 |
| 0.10% DL-serine |  | 100 |
| 0.50% DL-serine |  | 41 |
| 1.00% DL-serine |  | 0 |

*Example 7*

Compounds administered to the cotyledons; 10 plants per treatment.

|  | disease index | | disease index, rel. |
|---|---|---|---|
|  | det. | rel. |  |
| $H_2O$ | 47→ | 100 with 100 p.p.m. of G33 | 67 |
| DL-serine, 0.10% |  | do | 30 |
| DL-serine, 0.25% |  | 93 with 100 p.p.m. of G33 | 24 |
| DL-serine, 0.50% |  | 36 with 100 p.p.m. of G33 | 0 |
| DL-serine, 1.0% |  | 0 with 100 p.p.m. of G33 | 0 |

B. CUCUMBER PLANTS

Seedlings were transplanted into soil and used for experiments when several leaves had formed. The compounds to be examined were administered via the roots or by spraying the leaves. After a treatment of 2 or 3 days inoculation with conidia of *Cladosporium cucumerinum* took place. It was chiefly the flower-buds, the tendrils and the stalks of young leaves that were attacked. The degree of infection of the whole plant was estimated, whereby no infection=0, heavy infection=3. Here too, the disease index of the blank test was fixed to 100 to permit a better comparison.

*Example 8*

Plants were sprayed with solutions twice daily during two days. Inoculated 18 hours after last spraying; 6 plants per treatment.

|  | disease index | |
|---|---|---|
|  | det. | rel. |
| $H_2O$ | 15→ | 100 |
| NaDDC 100, p.p.m. |  | 93 |
| DL-serine, 0.25% |  | 66 |
| DL-serine, 0.50% |  | 48 |
| DL-serine, 0.25% with NaDDC, 100 p.p.m. |  | 47 |

C. TOMATO PLANTS

Plants from 6 weeks to 2 months old were placed with their roots in the solutions. After 2 days the solutions were replaced by tap-water. Inoculation with *Phytoph-*

*thora infestans* took place by spraying with a suspension of zoospores.

Estimation took place after 4–5 days. Heavily infected plants were given the number 3, non-infected ones 0.

Example 9

Compounds administered to the roots; 6 plants per treatment.

|  | disease index | |
|---|---|---|
|  | det. | rel. |
| H₂O | 12→ | 100 |
| NaDDC, 100 p.p.m. |  | 90 |
| DL-serine, 0.10% |  | 50 |
| DL-serine, 0.10% with NaDCC, 100 p.p.m. |  | 33 |

Example 10

Compounds administered to the roots; 6 plants per treatment.

|  | disease index | |
|---|---|---|
|  | det. | rel. |
| H₂O | 14→ | 100 |
| NaDDC, 100 p.p.m. |  | 100 |
| DL-alanine, 0.10% |  | 70 |
| DL-alanine, 0.10%+NaDDC, 100 p.p.m. |  | 65 |

D. LUPINE

Plants of circa 4 weeks old were used. Inoculation took place by brushing out 0.02 cc. of a conidial suspension of *Fusarium oxysporum* f. *lupini* on the roots. The plants were kept in Wisconsin tanks at 20°. From the 25th day of the inoculation on, the disease index was regularly determined. The degree of infection was estimated according to a 4-fold scale, in which 0=not infected, 3=completely wilted.

Example 11

Plants in a solution for 3 days. Inoculated with conidial suspension of *F. oxysporum* and planted in sterile sand; 5 days after inoculation, again solutions administered to roots during 3 days. Disease-index determined from 25 days after inoculation on, every 2 or 3 days; 20 plants to each treatment. The relative disease-index of the blank, 35 days after inoculation is assumed as 100.

|  | H₂O | NaDDC, 100 p.p.m. | DL-serine, 0.25% | DL-serine 0.25%+ NaDDC, 100 p.p.m. |
|---|---|---|---|---|
| 25 days | 28 | 21 | 28 | 5 |
| 27 days | 51 | 33 | 28 | 7 |
| 29 days | 65 | 40 | 37 | 7 |
| 31 days | 79 | 44 | 40 | 7 |
| 33 days | 81 | 51 | 53 | 8 |
| 35 days | 63→100 | 58 | 63 | 12 |

A treatment of the plants with the active agent only before the inoculation, with the same concentration as above, did not inhibit the infection.

E. BROAD BEANS

Plants with 2–3 well-developed pairs of leaves were placed in the solutions to be examined. After 2 days the solutions were replaced by tap-water, and the plants inoculated with *Botrytis fabae*, by spraying with a conidial suspension. After 24 hours in a humid atmosphere sufficient spots had already appeared on the leaves. Of each pair of leaves the number of spots on a surface of 18 x 18 mm.² as near as possible to the top on the upper side of the leaf was counted, whereby distinction was made between large and small spots. In the tables the average number of spots per surface of 18 x 18 mm.² is indicated, as well as the relative index.

Example 12

Compounds administered to the roots; 10 plants per treatment.

| average number of spots per 18 x 18 mm.² of leaf | disease index | | | |
|---|---|---|---|---|
|  | large, det. | small, det. | total | |
|  |  |  | det. | rel. |
| H₂O | 44.7 | 7.6 | 52.3→ | 100 |
| NaDDC, 100 p.p.m. | 26.2 | 7.2 | 33.9→ | 65 |
| DL-threonine, 0.10%+NaDDC, 100 p.p.m. | 19.6 | 4.5 | 24.1→ | 45 |
| DL-serine, 0.10% | 3.2 | 7.6 | 10.8→ | 21 |
| DL-serine+G33, 100 p.p.m. | 3.4 | 6.7 | 10.1→ | 19 |
| G33, 100 p.p.m. | 15.5 | 6.7 | 22.2→ | 42 |
| glycine, 0.1 | 43.3 | 10.1 | 53.4→ | 100 |
| glycine+G33, 100 p.p.m. | 18.4 | 10.2 | 28.6→ | 55 |

I claim:

1. A method for protecting plants against internal infection which comprises contacting said plants with a composition comprised of between 0.01% and 1.0% by weight of an amino acid having the formula $$R—CHNH_2—COOH$$

wherein R is selected from the group consisting of hydrogen, —CH₃, —CH₂OH, —CHOH—CH₃ and $$—CHOH—C_6H_5$$

and between 10 and 500 parts per million of an organic fungicide selected from the group consisting of sodium dimethyl dithiocarbamate, tetramethyl thiuram monosulfide, tetramethyl thiuram disulfide, 2,3-dichloro-naphthoquinone, N-(trichloromethylthio)-tetrahydro-phthalimide and S - (carboxymethyl)-N,N-dimethyl-dithiocarbamate and an inert carrier, whereby the composition is absorbed and protects the plant from internal infection.

2. A method as claimed in claim 1 wherein the inert carrier is water.

3. A method as claimed in claim 2 wherein the amino acid is glycine.

4. A method as claimed in claim 2 wherein the amino acid is DL-alanine.

5. A method as claimed in claim 4 wherein said organic fungicide is sodium dimethyl-dithiocarbamate.

6. A method as claimed in claim 5 wherein said organic fungicide is tetramethyl-thiuram-disulphide.

7. A method as claimed in claim 5 wherein the fungicidal organic substance is S-(carboxymethyl)-N-dimethyl-dithiocarbamate.

8. A systemic fungicidal composition for protecting plants against internal infection comprising an amino acid having the formula R—CHNH₂—COOH wherein R is selected from the group consisting of hydrogen, —CH₃, —CH₂OH, —CHOH—CH₃ and —CHOH—C₆H₅, said amino acids being in D and DL forms and an organic fungicide selected from the group consisting of sodium dimethyl dithiocarbamate, tetramethyl-thiuram-monosulphide, tetramethyl thiuram disulfide, 2,3-dichloro-naphthoquinone, N-(trichloromethylthio)-tetrahydro phthalimide and S - (carboxymethyl) - N,N-dimethyl-dithiocarbamate in a weight ratio of amino acid to organic fungicide higher than 1:5.

9. A composition as claimed in claim 8 wherein the organic fungicide is 2,3-dichloro-naphthoquinone.

10. A composition as claimed in claim 8 wherein the organic fungicide is N-(trichloromethyl-thio)-tetrahydro phthalimide.

11. The composition of claim 8 in which the weight ratio is between 1:5 and 100:1.

12. The composition of claim 11 in which R is hydrogen and the organic fungicide is sodium dimethyldithiocarbamate.

13. The composition of claim 8 in which R is hydrogen and the organic fungicide is tetramethyl thiuram disulfide.

14. The composition of claim 8 in which R is —$CH_3$ and the organic fungicide is sodium dimethyl dithiocarbamate.

15. The composition of claim 8 in which R is —$CH_2OH$ and the organic fungicide is tetramethyl thiuram disulfide.

16. A method for protecting plants against internal infection which comprises contacting said plants with an aqueous solution of DL-serine in a concentration between 0.01% and 1.0% by weight, whereby the solution is absorbed and protects the plant from internal infection.

17. A method for protecting plants against internal infection which comprises contacting said plants with an aqueous solution of D-serine in a concentration between 0.01% and 1.0% by weight, whereby the solution is absorbed and protects the plant from internal infection.

References Cited in the file of this patent

UNITED STATES PATENTS

| | | |
|---|---|---|
| 2,153,707 | Becherer | Apr. 11, 1939 |
| 2,293,034 | Moore | Aug. 18, 1942 |
| 2,717,850 | Schmitz | Sept. 13, 1955 |

OTHER REFERENCES

Hanna: Handbook of Agricultural Chemicals, 2nd Ed., (1958), pp. 157, 158.

Frear: A Catalogue of Insecticides and Fungicides, vol. I, page 82, vol. II, page 32, (1948).

King: U.S. Dept. Agr., Handbook, No. 69 (May 1954), pp. 45, 181, 309.

Chem. Abs., pp. 27, 5821 (9); 50, 12277(h); 33, 2585 (3).